US008731577B2

(12) United States Patent
Bai et al.

(10) Patent No.: US 8,731,577 B2
(45) Date of Patent: May 20, 2014

(54) METHOD AND APPARATUS FOR ENABLING VEHICLE APPLICATIONS USING HETEROGENEOUS WIRELESS DATA PIPES

(75) Inventors: Fan Bai, Ann Arbor, MI (US); Donald K. Grimm, Utica, MI (US); Massimo Osella, Troy, MI (US); Bo Yu, Warren, MI (US); David P. Pop, Garden City, MI (US); John J. Correia, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 13/585,676

(22) Filed: Aug. 14, 2012

(65) Prior Publication Data

US 2014/0051456 A1 Feb. 20, 2014

(51) Int. Cl.
*H04W 72/00* (2009.01)
(52) U.S. Cl.
USPC ..................................... 455/452.2; 455/552.1
(58) Field of Classification Search
USPC ........................... 455/414.1–414.2, 450–453; 370/329–350; 718/100–105
See application file for complete search history.

(56) References Cited

U.S. PATENT DOCUMENTS

| | | | |
|---|---|---|---|
| 7,738,914 B2 | 6/2010 | Joeressen | |
| 7,894,478 B2 | 2/2011 | Ullmann | |
| 8,126,477 B2 | 2/2012 | Dravida | |
| 2002/0080744 A1* | 6/2002 | Ozluturk | 370/335 |
| 2005/0254435 A1 | 11/2005 | Moakley | |
| 2011/0075635 A1 | 3/2011 | Ryu | |
| 2011/0209091 A1 | 8/2011 | Bucciarelli | |
| 2012/0036513 A1* | 2/2012 | Choong | 718/104 |

OTHER PUBLICATIONS

Andersson, Karl, "On Access Network Selection Models and Mobility Support in Heterogeneous Wireless Networks" Doctoral Thesis, Nov. 2010, 176 pgs.

* cited by examiner

*Primary Examiner* — Kashif Siddiqui
(74) *Attorney, Agent, or Firm* — John A. Miller; Miller IP Group, PLC

(57) ABSTRACT

A method for determining which of a plurality of data connectivity pipes will be used to transmit data for one or more applications operating on a vehicle. The method identifies which of the applications are active at a particular point in time and identifies a number of available configurations based on the number of applications that are active and the number of the data pipes that are available to transmit the data for the application. The method identifies a plurality of performance metrics for each configuration and determines an optimal performance value for each performance metric from all of the configurations. The method then determines an overall utility function for each configuration that is based on its performance metrics and the optimal performance value and selects a data pipe for each application that is active based on a maximum overall utility function from each application's available overall utility functions.

20 Claims, 2 Drawing Sheets

METHOD AND APPARATUS FOR ENABLING VEHICLE APPLICATIONS USING HETEROGENEOUS WIRELESS DATA PIPES

BACKGROUND OF THE INVENTION

1. Field of the Invention

This invention relates generally to a system and method for optimally determining which data connectivity pipe an application will use and, more particularly, to a system and method for optimally determining which data connectivity pipe an application wirelessly running on a vehicle will use, where the data pipes include cellular, user smart phone using in-cabin WiFi, and WiFi/DSRC.

2. Discussion of the Related Art

As vehicles become more technologically advanced, they become more digitally sophisticated and will be able to download, store and operate many digital applications that perform various functions, such as entertainment functions, information functions, vehicle diagnostic functions, etc. For example, vehicle applications may provide various internet connections, software reflashing, video and music downloading, video streaming, telematic system diagnostics, dealership service applications, interactive maps, etc. Those applications will be able to wirelessly interact through data connectivity with many and various data sources and other devices both inside and outside the vehicle.

For modern vehicles going forward, multiple data connectivity pipes will likely exist where applications stored on the vehicle can wirelessly interact through data transfer, where those data pipes are cellular, such as OnStar™, smart phone using in-cabin WiFi, and an external WiFi/DSRC (dedicated short range communications). For cellular, bandwidth capabilities are typically low, for example, about 300 kbps, the latency to get service is typically low, the power requirement is unlimited and the cost is typically high, where the power is the energy consumed by the particular data pipe to provide the data transfer, the cost is the price to a user that uses the particular data pipe, latency is the time between when the application requests particular data and when the application actually gets that data, and bandwidth is the rate the data is transferred. A high latency or high delay tolerance may be up to 10 minutes and a low latency or low delay tolerance may be less than 5 seconds. For smart phone, the bandwidth required is typically in the medium range, for example, 1-2 Mbps, the latency to get service is low, the power requirement is limited and the cost is low. For WiFi/DSRC, the bandwidth is typically high, for example, 27-54 Mbps, the latency to get service is typically high, for example, when there is no remote vehicle or access point within communications range, the power requirement is unlimited and the cost is nothing. The external WiFi/DSRC may be a WiFi connection provided by the vehicle to an external hot spot, such as a place of business, the owner's home, a service center, another vehicle, etc.

The vehicle may be running many different applications at a particular point in time, some of which may be unknown to the vehicle driver. Currently, each application is assigned to a particular data pipe, and that assignment cannot be changed. It may be desirable to continuously determine the data usage requirements for each application so that the connected vehicle applications can operate in the most efficient and cost effective manner. For example, if a video is being streamed to the vehicle, which requires low latency and high bandwidth, the user's personal smart phone may be the best option to satisfy those requirements, but may be very costly. Therefore, it would be desirable to select the proper data pipe for a particular application that provides the best optimization goals by reducing cost to the user without sacrificing performance.

SUMMARY OF THE INVENTION

In accordance with the teachings of the present invention, a system and method are disclosed for determining which of a plurality of data connectivity pipes will be used to transmit data for one or more applications operating on a vehicle. The method includes determining a default bandwidth demand and a default delay tolerance for each of the applications and modifying the default bandwidth and the default delay tolerance as the applications are active over time. The method identifies which of the applications are active at a particular point in time and identifies a number of available configurations based on the number of applications that are active and the number of the data pipes that are available to transmit the data for the application. The method identifies a plurality of performance metrics for each configuration and determines an optimal performance value for each performance metric from all of the configurations. The method then determines an overall utility function for each configuration that is based on its performance metrics and the optimal performance value, and selects a data pipe for each active application based on a maximum overall utility function from each application's available overall utility functions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining which data pipe will be used by a vehicle application to transfer data is merely exemplary in nature, and is in no way intended to limit the invention or its applications or uses. For example, the system and method discussed herein are specific to providing data connectivity for applications running on a vehicle. However, as will be appreciated by those skilled in the art, the system and method may have uses other than vehicle applications.

Figure 1:
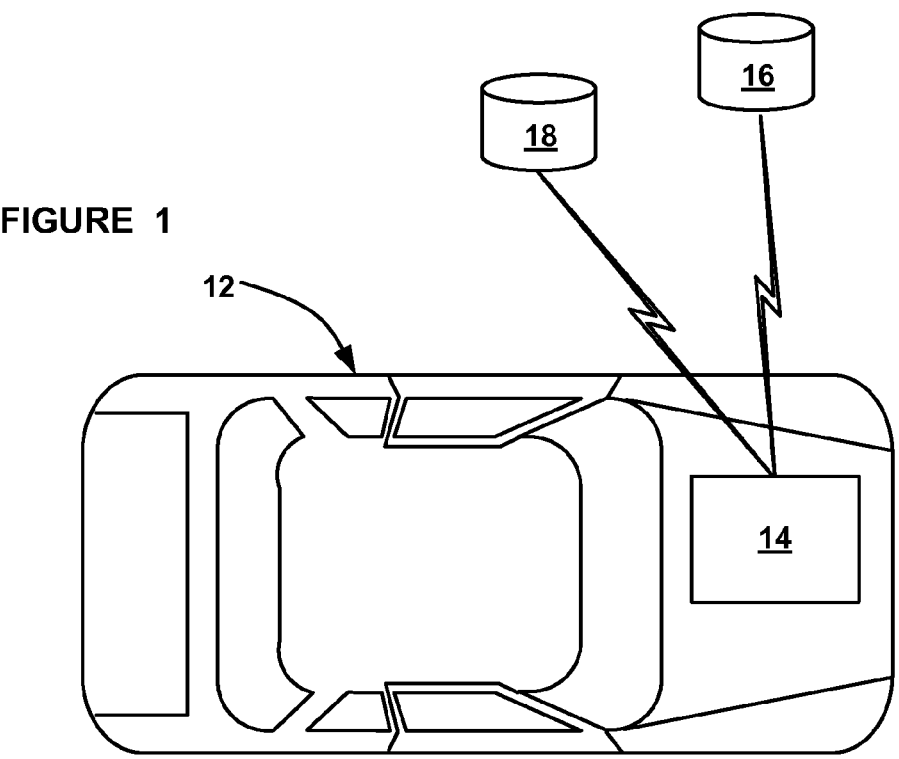
FIG. 1 is an illustration of a vehicle including a controller for storing and processing vehicle applications.

FIG. 1 is an illustration of a system 10 including a vehicle 12 having a controller 14 that stores and processes various and several vehicle applications that may be embedded into the vehicle at the time of manufacture or downloaded from various sources represented by box 16, such as a server, satellite, On-Star™ facility, etc., and which may provide data connectivity through a wireless data stream with some other entity represented by box 18, such as an internet hot spot at a business, another vehicle, a wireless modem at the user's home, a service center or dealership, etc.

Figure 2:
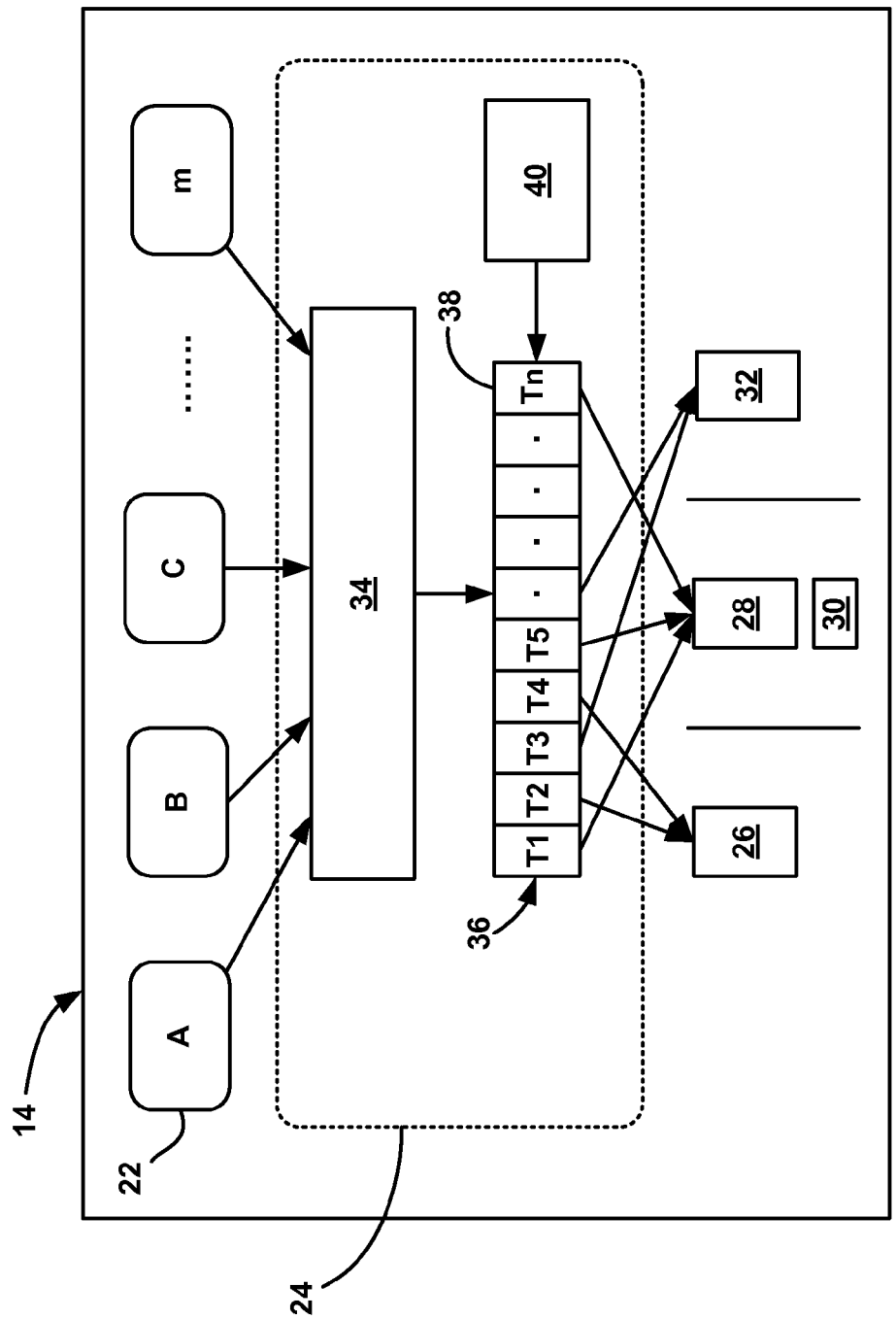
FIG. 2 is a block diagram of the controller showing a process for selecting which data pipe an application will use to transfer data.

FIG. 2 is an illustration of the architecture of the controller 14 that stores and processes various and several applications 22, shown as applications A, B, C, . . . , m. The applications 22 are intended to be any application suitable to be operated on a vehicle that wirelessly transfers data to and from the vehicle 12, where those applications 22 are virtually unlimited. The controller 14 includes middleware 24 that provides an interface for data transfer between the applications 22 and three different types of data connectivity pipes, namely, a cellular data pipe 26, such as On-Star™, a user smart phone data pipe 28 in combination with an in-cabin WiFi 30, and a WiFi/DSRC data pipe 32 external to the vehicle 12, where the middleware 24 optimally determines which of the data pipes 26, 28 or 32 the application 22 will use. As will be understood, the number of potential data pipes may be greater than three if there is more than one data pipe of a similar type, for example, if there is an external WiFi and DSRC data pipe available on the vehicle. In such cases, the middleware 24 will logically assign the appropriate sub-data pipe based on the proposed methodology.

As will be discussed in detail below, the middleware 24 includes an application demand estimator 34 that determines the necessary or desired bandwidth requirement and latency requirement for a particular application 22 and provides that estimate to a data pipe dispatcher 36 that selects which of the data pipes 26, 28 or 32 will be used by the particular application 22 at a particular point in time. The data pipe dispatcher 36 is shown to include a number of tasks 38, identified as T1, T2, T3, T4, T5, . . . , Tn that represent the applications 22 that are in operation or active at any particular point in time, where n may be no applications, may be all of the applications 22 or may be any number of the applications 22. The data pipe dispatcher 36 also receives configuration signals from a multi-criteria utility optimization engine 40 within the middleware 24 that identifies the optimal data pipe 26, 28 or 32 for each of the tasks 38 based on a number of performance criteria, such as, cost, energy and latency, in combination with the bandwidth requirements provided by the demand estimator 34.

Each application 22 is initially assigned a default bandwidth demand and delay tolerance requirement by the application manufacturer that is provided by the application 22 to the demand estimator 34. That default bandwidth demand and delay tolerance requirement is unlikely to be the actual bandwidth necessary and the delay tolerance required for that application 22 when being used by a particular user in the vehicle 12. In other words, the ability of the application 22 to operate at its maximum capacity and its best ability is typically not what will be required by the actual user of the application 22.

Figure 3:
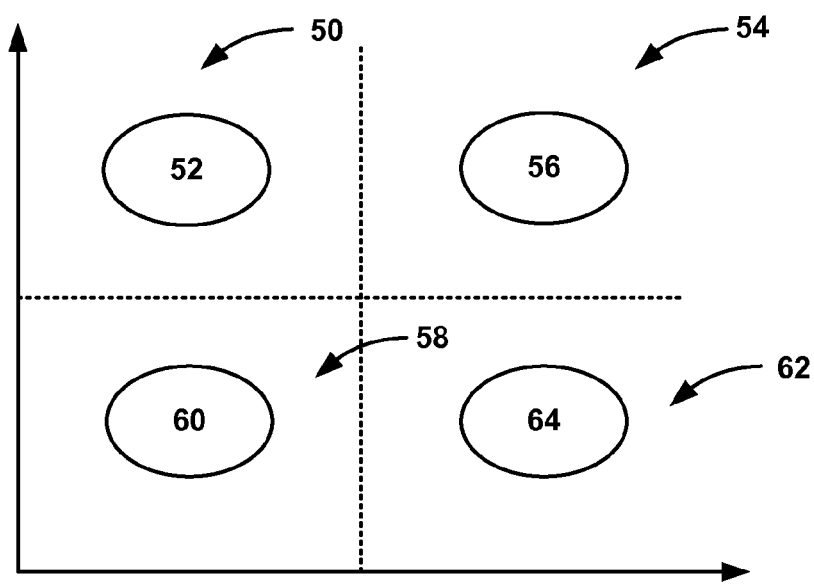
FIG. 3 is a graph categorizing delay tolerance and bandwidth for different applications.

The demand estimator 34 identifies a rough estimate of the bandwidth demand and the delay tolerance requirement based on the default for each of the applications 22 by categorizing each application 22 into one of four categories 1-4. FIG. 3 is a representation of those categories and includes bandwidth demand on the horizontal axis and delay tolerance (latency) on the vertical axis. The graph in FIG. 3 is separated into four sections for each of the categories 1-4. Section 50 represents category 1 and includes those applications 22, such as LBS updates, represented by oval 52, that have a low default bandwidth demand, for example, 100 kbps-1 Mbps, and a high default delay tolerance, for example, up to ten minutes. Section 54 represents category 2 and includes those applications 22, such as map downloading, reflashing, etc., represented by oval 56, that have a high default bandwidth demand, such as up to 800 Mbps, and a high default delay tolerance, such as under 10 seconds. Section 58 represents category 3 and includes those applications 22, such as audio streaming, represented by oval 60, that have a low default bandwidth demand and a low default delay tolerance. Section 62 represents category 4 and includes those applications 22, such as video streaming, represented by oval 64, that have a high default bandwidth demand and a low default delay tolerance.

Once the demand estimator 34 identifies the rough bandwidth and delay estimation for the particular application 22, the estimator 34 performs a refined estimation to determine what the actual bandwidth and delay tolerance is for that application 22 as the application 22 is used by the user over time. The range of bandwidth and delay tolerance in each of the categories 1-4 is relatively wide in that the specific bandwidth demand delay tolerance within a particular category may determine which of the data pipes 26, 28 or 32 is used even though the particular bandwidth demand or delay tolerance is still in the same category.

The demand estimator 34 monitors the use of the particular application 22 as it is used by the user to determine its actual bandwidth demand and delay tolerance. For example, a particular video streaming application may require low resolution or high resolution, where both uses are in category 4 for the application 22. Each time a particular application 22 is used, the demand estimator 34 determines the actual bandwidth demand for that application 22 to determine what data pipe will be used for that application 22 the next time it is used. In other words, the demand estimator 34 statistically tracks and predicts the applications bandwidth and delay demands each time the particular application 22 is used. Initially, the demand estimator 34 may not optimally determine the proper data pipe 26, 28 or 32 for a particular application 22, where it may need to monitor the application usage over time to achieve that optimization. In other words, it may take a period of time before the demand estimator 34 actually optimizes the bandwidth demand and delay tolerance for a particular application 22 as it is being used for a particular user.

In one embodiment, the demand estimator 34 tracks and predicts the bandwidth and delay demands of the application 22 using weighted time average filters, for example, low-pass filters, such as defined for the bandwidth (BWD) at time t for a particular application $app_i$ in equation (1) and the delay tolerance (Delay) at time t for a particular application $app_i$ in equation (2). In equations (1) and (2), $\alpha$ is a weighting parameter between 0 and 1.

$$\overline{BWD}(app_i, t) = \alpha \cdot BWD(app_i, t) + (1-\alpha) \cdot \overline{BWD}(app_i, t-1) \quad (1)$$

$$\overline{Delay}(app_i, t) = \alpha \cdot Delay(app_i, t) + (1-\alpha) \cdot \overline{Delay}(app_i, t-1) \quad (2)$$

As mentioned above, each of the tasks 38 represents a particular application 22 that is running at a particular point in time. Because each task 38 can use any of the three data pipes 26-32, there are $3^n$ (n tasks 38) unique combinations, i.e., configurations $C_i$, where $C_i \in [1, 2, 3, \ldots 3^n]$, for the tasks 38 to use the data pipes 26, 28 and 32. As will be discussed below, the multi-criteria utility optimization engine 40 uses a number of performance metrics in combination with the current bandwidth demand for the application 22 to determine which of the data pipes 26, 28 and 32 will be used by the particular task 38 based on a combined optimization for all of the tasks 38 running at a particular point in time.

Because many of the applications 22 could be running at a particular point of time, the computation by the engine 40 to determine the optimization could be intense for a large n value. The engine 40 could reduce the computational complexity by grouping the large number of n tasks into k subgroups based on the importance of the task 38, where each group has an average n/k task. In other words, instead of calculating the optimal configuration $C_i$ for the task 38 based on the number of tasks n, the engine 40 would calculate the optimal configuration $C_i$ based on k of the n tasks 38.

$$k \cdot 3^{\left[\frac{n}{k}\right]} \ll 3^n \quad (3)$$

The multi-criteria utility optimization engine 40 determines which particular configuration $C_i$ each task 38 will use based on an overall utility function $u_{c_i}$ for the configuration $C_i$. In one embodiment, for each configuration $C_i$, three performance metrics are identified, namely, price (cost) $P_i$, latency $L_i$ and energy $E_i$, which are used in the data pipe optimization process in combination with the application's estimated bandwidth demand. From all of the configurations $C_i$ for all of the n tasks 38, the engine 40 finds the configuration $C_i$ with the minimum price $P_{min}$, the configuration $C_i$ with the minimum latency $L_{min}$ and the configuration $C_i$ with the minimum energy $E_{min}$. Using the metrics for each configuration $C_i$ and the minimum metrics, the overall utility function $u_{c_i}$ for each specific configuration $C_i$ can be defined based on a price utility function $u_{p_i}$, a latency utility function $u_{l_i}$, and an energy utility function $u_{e_i}$, where:

$$u_{p_i} = f(P_i) = \frac{P_{min} - P_i}{P_i} \quad (4)$$

$$u_{l_i} = f(L_i) = \frac{L_{min} - L_i}{L_i} \quad (5)$$

$$u_{e_i} = f(E_i) = \frac{E_{min} - E_i}{E_i} \quad (6)$$

Thus, the overall utility function $u_{c_i}$ for each configuration $C_i$ is given by:

$$\begin{aligned} u_{c_i} &= a_1 u_{p_i} + a_2 u_{l_i} + a_3 u_{e_i} \\ &= a_1 \frac{P_{min} - P_i}{P_i} + a_2 \frac{L_{min} - L_i}{L_i} + a_3 \frac{E_{min} - E_i}{E_i} \end{aligned} \quad (7)$$

where $\alpha_1 + \alpha_2 + \alpha_3 = 1$ and where $\alpha_1$, $\alpha_2$ and $\alpha_3$ are adjustable weights that reflect the weight of an optimized price, optimized latency and optimized energy when making the final data pipe decision.

Once the overall utility function $u_{c_i}$ is calculated for each of the configurations $C_i$, the data dispatcher 36 selects which of the three available configurations for each task 38 has the maximum overall utility function as:

$$C_j = \max_i(u_{c_i}), C_i \in [1, 2, 3, \ldots, 3^n] \quad (8)$$

As discussed, the middleware 24 selects which of the data pipes 26, 28 or 32 a particular task 38 will use based on an optimization of the combined tasks 38 at a particular point in time. Because each of the price utility functions $u_{p_i}$, the latency utility functions $u_{l_i}$ and the energy utility functions $u_{e_i}$ are calculated based on the minimum price $P_{min}$, the minimum latency $L_{min}$ and the minimum energy $E_{min}$ from equations (4)-(6) for all the n tasks 38, the overall utility function $u_{c_i}$ for a particular task 38 is based on the overall utility function $u_{c_i}$ for all of the tasks 38. Stated differently, the optimization of running all of the tasks 38 at a particular point in time is based on the combination of all of the tasks 38 running at that time and not necessarily on the optimization for a single one of the tasks 38.

The discussion above used price, latency and energy as performance metrics to determine the overall utility function for a task 38. It is noted that this is by way of a non-limiting example in that other criteria and other performance metric combinations can also be employed to determine the utility function, such as the reliability of a particular data pipe. Further, the weight parameter $\alpha_1$, $\alpha_2$ and $\alpha_3$ can be constant throughout the operation of the controller 14 or can be adjustable over time as the controller 14 becomes more knowledgeable about the applications 22 being operated.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining which of a plurality of data connectivity pipes will be used to transmit data for one or more applications operating on a vehicle, said method comprising:
    determining a default bandwidth demand and a default delay tolerance for each of the applications;
    modifying the default bandwidth demand and the default delay tolerance for each of the applications as the applications are active over time;
    identifying which of the applications are active at a particular point in time;
    identifying a number of configurations based on the number of applications that are active at the particular point in time and the number of the data pipes that are available to transmit data for the applications;
    identifying a plurality of performance metrics for each configuration;
    determining an optimal performance value for each performance metric from all of the configurations;
    determining an overall utility function for each configuration that is based on its performance value and the optimal performance value; and
    selecting a data pipe for each application that is active based on a maximum overall utility function from each application's available overall utility function.

2. The method according to claim 1 wherein identifying a default bandwidth demand and a default delay tolerance includes categorizing each application into one of four categories including a first category having a low bandwidth demand and a high delay tolerance, a second category having a high bandwidth demand and a high delay tolerance, a third category having a low bandwidth demand and a high delay tolerance, and a fourth category having a high bandwidth demand and a low delay tolerance.

3. The method according to claim 1 wherein modifying the default bandwidth demand and the default delay tolerance includes statistically tracking and predicting bandwidth demands and delay tolerance for each of the applications as they are active.

4. The method according to claim 3 wherein modifying the default bandwidth demand and the default delay tolerance includes using a weighted time average filter that filters the bandwidth demand and delay tolerance as the application is active.

5. The method according to claim 1 wherein identifying a plurality of performance metrics includes identifying a price, delay tolerance, reliability of communication, and/or energy performance metric for each configuration.

6. The method according to claim 5 wherein determining an overall utility function for each configuration includes defining a price utility function, a delay tolerance utility function, a reliability of communication utility function, and/or an energy utility function for each configuration.

7. The method according to claim 6 wherein determining an overall utility function for each configuration includes using the equation:

$$u_{c_i} = a_1 u_{p_i} + a_2 u_{l_i} + a_3 u_{e_i}$$
$$= a_1 \frac{P_{min} - P_i}{P_i} + a_2 \frac{L_{min} - L_i}{L_i} + a_3 \frac{E_{min} - E_i}{E_i}$$

where $u_{c_i}$ is an overall utility function for a configuration, $u_{p_i}$ is the price utility function, $u_{l_i}$ is the delay tolerance utility function, $u_{e_i}$ is the energy utility function, $P_i$ is the price metric for a particular configuration, $P_{min}$ is the minimum price metric, $L_i$ is the delay tolerance metric for a particular configuration, $L_{min}$ is the minimum delay tolerance metric, $E_i$ is the energy metric for a particular configuration, $E_{min}$ is the minimum energy metric, $\alpha_1$ is an optimized price weight, $\alpha_2$ is an optimized latency weight, and $\alpha_3$ is an optimized energy weight.

8. The method according to claim 1 wherein identifying which of the applications are active at a particular point in time includes grouping the applications that are active into sub-groups if the number of applications that are active at the particular point in time exceeds a predetermined maximum number.

9. The method according to claim 1 wherein the data connectivity pipes include one or more of cellular, smart phone with vehicle in-cabin WiFi, and an external WiFi/DSRC connection.

10. A method for determining which of a plurality data connectivity pipes will be used to transmit data for one or more applications operating on a vehicle, said data connectivity pipes including cellular, smart phone and WiFi/DSRC, said method comprising:
identifying which of the applications are active at a particular point in time;
identifying a number of configurations based on the number of applications that are active at the particular point in time and the number of the data pipes that are available to transmit data for the applications;
identifying a plurality of performance metrics for each configuration;
determining an optimal performance value for each performance metric from all of the configurations;
determining an overall utility function for each configuration that is based on its performance metrics and the optimal performance value; and
selecting a data pipe for each application being that is active based on a maximum overall utility function from each application's available overall utility functions.

11. The method according to claim 10 wherein identifying a plurality of performance metrics includes identifying a price, delay tolerance, reliability of communication, and/or energy performance metric for each configuration.

12. The method according to claim 11 wherein determining an overall utility function for each configuration includes defining a price utility function, a delay tolerance utility function, a reliability of communication utility function, and/or an energy utility function for each configuration.

13. The method according to claim 12 wherein determining an overall utility function for each configuration includes using the equation:

$$u_{c_i} = a_1 u_{p_i} + a_2 u_{l_i} + a_3 u_{e_i}$$
$$= a_1 \frac{P_{min} - P_i}{P_i} + a_2 \frac{L_{min} - L_i}{L_i} + a_3 \frac{E_{min} - E_i}{E_i}$$

where $u_{c_i}$ is an overall utility function for a configuration, $u_{p_i}$ is the price utility function, $u_{l_i}$ is the delay tolerance utility function, $u_{e_i}$ is the energy utility function, $P_i$ is the price metric for a particular configuration, $P_{min}$ is the minimum price metric, $L_i$ is the delay tolerance metric for a particular configuration, $L_{min}$ is the minimum delay tolerance metric, $E_i$ is the energy metric for a particular configuration, $E_{min}$ is the minimum energy metric, $\alpha_1$ is an optimized price weight, $\alpha_2$ is an optimized latency weight, and $\alpha_3$ is an optimized energy weight.

14. The method according to claim 10 wherein identifying which of the applications are active at a particular point in time includes grouping the applications that are active into sub-groups if the number of applications that are active at the particular point in time exceeds a predetermined maximum number.

15. A system for determining which of a plurality data connectivity pipes will be used to transmit data for one or more applications operating on a vehicle, said system comprising:
means for identifying which of the applications that are active at a particular point in time;
means for identifying a number of available configurations based on the number of applications that are active at the particular point in time and the number of the data pipes that are available to transmit data for the applications;
means for identifying a plurality of performance metrics for each configuration;
means for determining an optimal performance value for each performance metric from all of the configurations;
means for determining an overall utility function for each configuration that is based on its performance metrics and the optimal performance value; and
means for selecting a data pipe for each application that is active based on a maximum overall utility function from each application's available overall utility functions.

16. The system according to claim 15 wherein the means for identifying a plurality of performance metrics identifies a price, delay tolerance, reliability of communication, and/or energy performance metric for each configuration.

17. The system according to claim 16 wherein the means for determining an overall utility function for each configuration defines a price utility function, a delay tolerance utility function, a reliability of communication utility function, and/or an energy utility function for each configuration.

18. The system according to claim 17 wherein the means for determining an overall utility function for each configuration uses the equation:

$$u_{c_i} = a_1 u_{p_i} + a_2 u_{l_i} + a_3 u_{e_i}$$
$$= a_1 \frac{P_{min} - P_i}{P_i} + a_2 \frac{L_{min} - L_i}{L_i} + a_3 \frac{E_{min} - E_i}{E_i}$$

where $u_{c_i}$ is an overall utility function for a configuration, $u_{p_i}$ is the price utility function, $u_{l_i}$ is the delay tolerance utility function, $u_{e_i}$ is the energy utility function, $P_i$ is the price metric for a particular configuration, $P_{min}$ is the minimum price metric, $L_i$ is the delay tolerance metric for a particular configuration, $L_{min}$ is the minimum delay tolerance metric, $E_i$ is the energy metric for a particular configuration, $E_{min}$ is the minimum energy metric, $\alpha_1$ is an optimized price weight, $\alpha_2$ is an optimized latency weight, and $\alpha_3$ is an optimized energy weight.

19. The system according to claim 15 wherein the means for identifying a default bandwidth demand and a default delay tolerance categorizes each application into one of four categories including a first category having a low bandwidth demand and a high delay tolerance, a second category having a high bandwidth demand and a high delay tolerance, a third category having a low bandwidth demand and a high delay tolerance, and a fourth category having a high bandwidth demand and a low delay tolerance.

20. The system according to claim 15 wherein the means for modifying the default bandwidth demand and the default delay tolerance statistically tracks and predicts bandwidth demands and delay tolerance for each of the applications as they are active.

* * * * *